July 8, 1930.  H. A. THOMPSON  1,770,049
RAILWAY BOOTLEG
Filed March 5, 1928  2 Sheets-Sheet 1
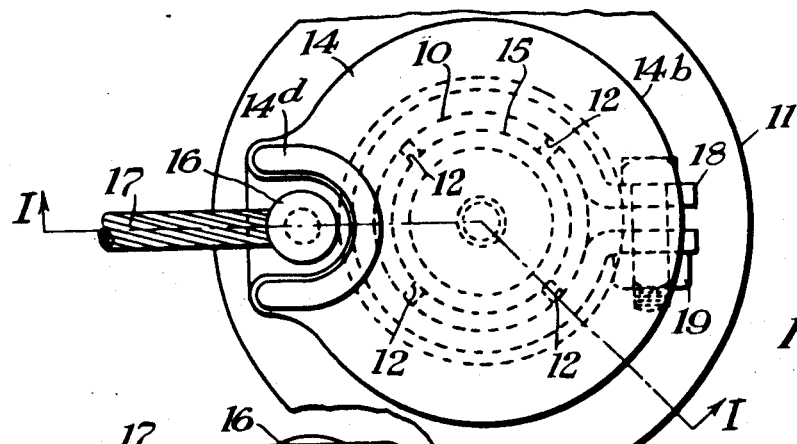
Fig. 2.
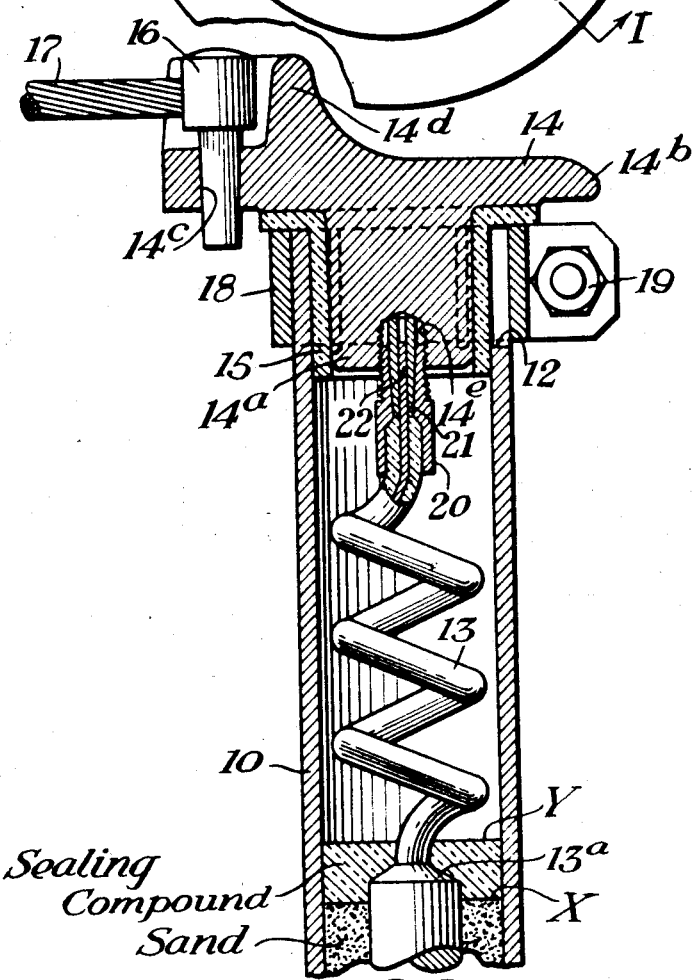
Fig. 1.
INVENTOR:
H. A. Thompson,
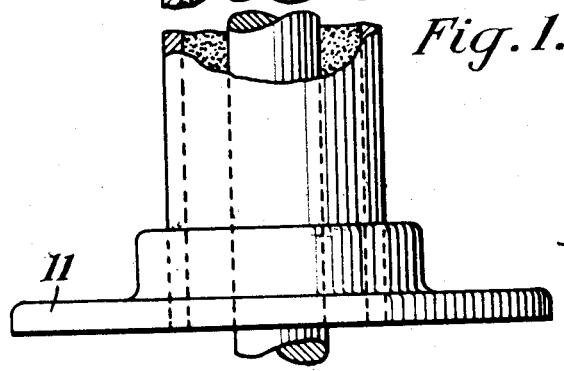

July 8, 1930. H. A. THOMPSON 1,770,049
RAILWAY BOOTLEG
Filed March 5, 1928 2 Sheets-Sheet 2

Sealing Compound.

Sand

INVENTOR:
H. A. Thompson,
by A. A. Vencill
His Attorney.

Patented July 8, 1930

1,770,049

UNITED STATES PATENT OFFICE

HOWARD A. THOMPSON, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY BOOTLEG

Application filed March 5, 1928. Serial No. 259,113.

My invention relates to railway bootlegs, that is, to devices for connecting electric conductors with the track rails of a railway, for use in railway signaling and automatic train control.

I will describe two forms of bootlegs embodying my invention, and will then point out the novel features thereof in claims.

Figure 4:
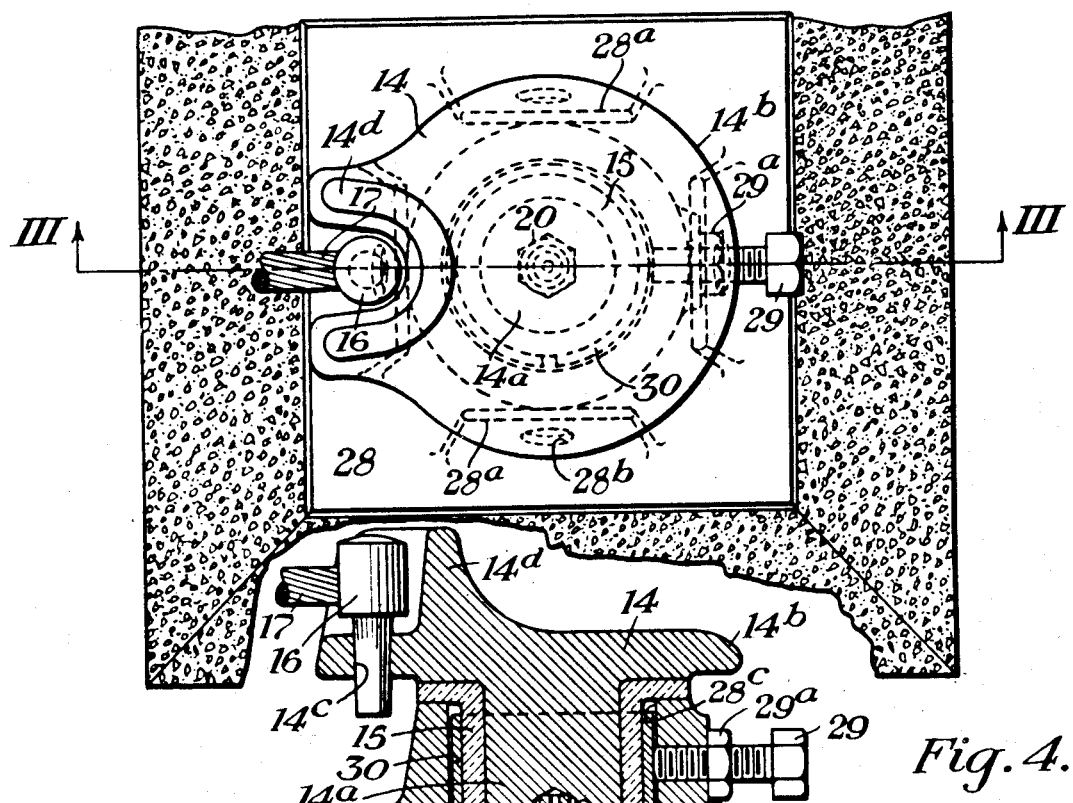
Figure 4:
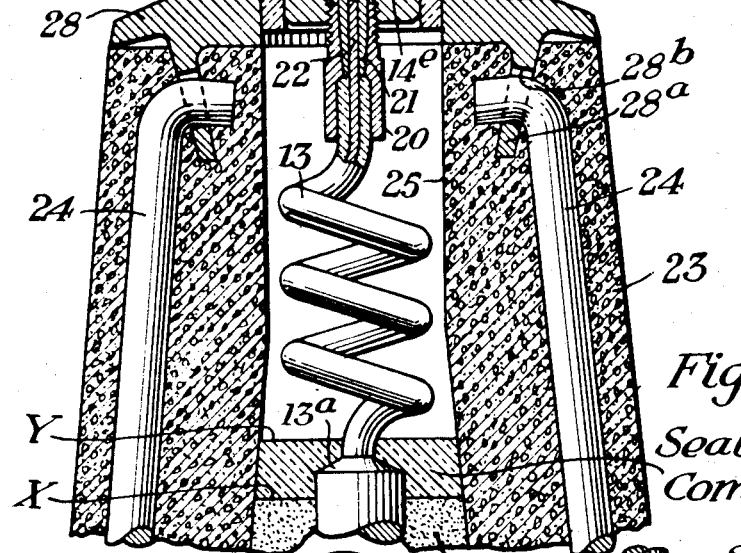
Figure 3:
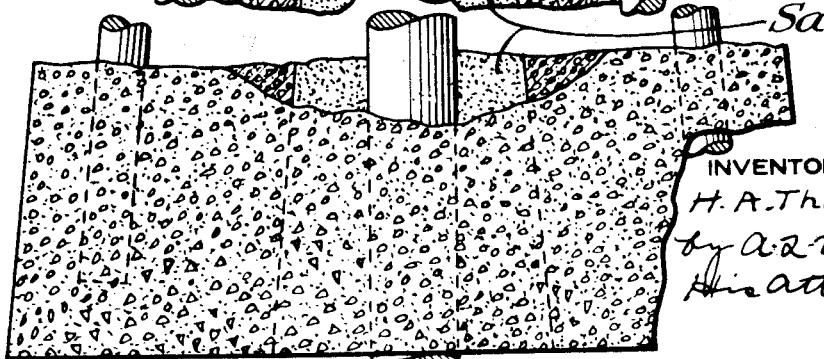

In the accompanying drawings, Fig. 1 is a sectional view showing one form of bootleg embodying my invention, and Fig. 2 is a top plan view of the bootleg shown in Fig. 1. Fig. 1 is a section on the line I—I of Fig. 2. Fig. 3 is a sectional view illustrating another form of bootleg also embodying my invention, and Fig. 4 is a top plan view of the bootleg shown in Fig. 3. Fig. 3 is a section on the line III—III of Fig. 4.

Similar reference characters refer to similar parts in each of the several views.

Referring first to Figs. 1 and 2, the bootleg comprises a suitable housing such as a pipe 10, the lower end of which will be imbedded in the ground, and the upper end of which will project above the surface of the ground. The lower end of the pipe 10 is threaded to receive a flange 11 by means of which the pipe 10 may be securely anchored in place. An insulated conductor 13, provided with a metallic protective covering 13ª, is brought up from the ground through the pipe 10.

The reference character 14 designates a metal head, preferably a cadmium plated steel drop forging, which head is supported by the upper end of the pipe 10. As here shown, the head 14 comprises a shank 14ª which enters the pipe 10 with considerable clearance, and a flange 14ᵇ which extends over the upper end of the pipe. The head 14 is insulated from the pipe 10 by a bushing 15 having a cylindrical part which is interposed between the pipe and the shank 14ª, and a flanged portion which lies between the end of the pipe 10 and the flange 14ᵇ of the head 14.

The inner end of the shank 14ª is provided with a threaded hole 14ᵉ which is adapted to receive a plug 20. A split cone 21 fits within the plug 20, and when the plug is tightened the cone grips the exposed end 22 of the conductor 13 to electrically connect the conductor with the head 14. The flange 14ᵇ is further provided with a hole 14ᶜ to receive a plug 16 attached to a rail connector 17, whereby the head 14 may be electrically connected with the track rail, which is not shown in the drawing. A rib 14ᵈ partially surrounds the hole 14ᶜ to protect the plug 16 from damage due to dragging railway equipment.

The upper end of the pipe 10 is provided with a plurality of longitudinal slots 12, and surrounding the upper end of the pipe 10 is a clamp 18 which may be drawn together by a bolt 19 to lock the head 14 in place in the pipe.

In assembling the parts of the bootleg, the metallic protective covering 13ª is first removed from the upper end of the insulated conductor 13. The pipe 10 is then embedded in the ground with the conductor 13 extending upwardly therethrough, and the part from which the protective covering has been removed is coiled back into the pipe to provide an additional length of the conductor in the event the conductor becomes broken. The lower part of the conductor 13 is next sealed into the pipe to prevent moisture from seeping back into the conductor structure. I prefer to accomplish this result by filling the pipe 10 with sand to some point X, and from this point with sealing compound to some point Y until the end of metallic protective covering 13ª has been completely covered. The conductor 13 is pulled far enough out of the upper end of the pipe 10 to permit the insulation to be cut back for a short distance, and the exposed end 22 of the conductor is inserted into the connector 20 and the split cone 21. The connector 20 is then screwed into hole 14ᵉ to connect the conductor 13 with the head 14. The bushing 15 is then inserted in the pipe, the head 14 is next inserted in the bushing 15, and the clamp 18 is applied to the pipe 10 and is drawn together by means of a bolt 19 to lock the head 14 in place. Finally, the plug 16 is driven into the hole 14ᶜ in the head 14.

In the modification shown in Figs. 3 and 4, the pipe 10 is replaced by a concrete structure 23, the lower end of which will be imbedded in the ground and the upper end of which will extend above the ground. The concrete structure 23 is provided with a vertically extending centrally located hole 25, and the conductor 13 is brought up through this hole. The metal protective covering 13ª is removed from the upper end of the conductor, and to prevent moisture from seeping into the cable structure, the hole 25 is filled with sand and sealing compound to a point above the end of the protective covering in the same manner as explained in connection with Figs. 1 and 2.

The upper part of the concrete structure 23 is provided with a metal member 28 having a plurality of downwardly extending lugs 28ª imbedded in the concrete. Each lug 28ª has a hole 28ᵇ therein, and an anchor rod 24 enters the hole in each lug to securely hold the head in place. The member 28 is further provided with a vertical hole 28ᶜ, the diameter of which is smaller at the bottom than at the top of the hole to form a shoulder which supports a split metal cylinder 30. This shoulder prevents the cylinder 30 from falling into the hole 25 in the concrete structure 23. A set screw 29, provided with a lock nut 29ª, is threaded through the side of the metal member 28 to grip the cylinder 30.

The metal head 14 fits within the hole 28ᶜ in the member 28 and is insulated from the member 28 and the cylinder 30 by the bushing 15. The rail connector 17 and the conductor 13 are connected with the head 14 in the same manner as described in connection with Figs. 1 and 2. Tightening set screw 29 compresses the split cylinder 30 to clamp the head 14 in place.

Although I have herein shown and described only two forms of bootlegs embodying my invention, it is understood that various changes and modifications may be made therein within the scope of the appended claims without departing from the spirit and scope of my invention.

Having thus described my invention, what I claim is:

1. A bootleg for connecting an electric conductor with a track rail, comprising a housing projecting upwardly from the ground and enclosing the conductor, a metal head supported by the upper end of said housing and insulated therefrom and provided with means for electrical connection with said conductor, said head having a hole to receive a plug for attachment of a rail connector, and said head also having a rib partially surrounding said hole to protect the rail connector plug from damage by dragging railway equipment.

2. A bootleg for connecting an electrical conductor with a track rail, comprising a concrete structure provided with a vertically extending hole receiving the conductor, a metal member provided with a vertical hole and anchored to the top of the concrete structure, a split metal cylinder fitting within the hole in said member, a metal head having a shank projecting inside the hole in said member and provided with a flange extending over the upper edge of the member, an insulating bushing between said head and said member, a set screw for holding said head in place by compressing said split cylinder, the shank of the metal head being provided with means for connection with the conductor, and the flange of the head being provided with means for connection with a rail connector.

3. A bootleg for connecting an electric conductor with a track rail, comprising a housing projecting upwardly from the ground and enclosing the conductor, a metal head supported by the upper end of said housing and insulated therefrom and provided with a threaded hole, a hollow plug screwed into said hole, a split cone fitting within said plug and gripping the end of said conductor, and means for connecting said head with a rail connector.

In testimony whereof I affix my signature.

HOWARD A. THOMPSON.